(12) United States Patent
DeLuca et al.

(10) Patent No.: US 9,713,118 B1
(45) Date of Patent: Jul. 18, 2017

(54) DEVICE TAGGING USING MICRO-LOCATION MOVEMENT DATA

(71) Applicant: International Business Machines Corporation, Armonk, NY (US)

(72) Inventors: Lisa Seacat DeLuca, Baltimore, MD (US); Jeremy A. Greenberger, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/268,969

(22) Filed: Sep. 19, 2016

(51) Int. Cl.
*H04W 24/00* (2009.01)
*H04W 64/00* (2009.01)
*H04L 29/08* (2006.01)
*H04W 4/02* (2009.01)

(52) U.S. Cl.
CPC ............. *H04W 64/00* (2013.01); *H04L 67/22* (2013.01); *H04W 4/025* (2013.01)

(58) Field of Classification Search
CPC ........ H04W 64/00; H04W 4/025; H04L 67/22
See application file for complete search history.

(56) References Cited

U.S. PATENT DOCUMENTS

| | | | |
|---|---|---|---|
| 6,199,081 B1 | 3/2001 | Meyerzon et al. | |
| 8,489,450 B2 | 7/2013 | Agarwal | |
| 9,247,391 B1* | 1/2016 | Hopkins, III | ......... H04W 4/021 |
| 2006/0085419 A1* | 4/2006 | Rosen | ................. G06F 17/3087 |
| 2008/0051081 A1* | 2/2008 | Nelson | .................... G06Q 10/00 455/432.3 |
| 2010/0057843 A1* | 3/2010 | Landsman | .......... H04L 63/0407 709/203 |
| 2010/0076976 A1 | 3/2010 | Sotirov et al. | |
| 2013/0166352 A1 | 6/2013 | Scarr et al. | |
| 2013/0238686 A1* | 9/2013 | O'Donoghue | ......... G06Q 30/02 709/203 |
| 2014/0257991 A1 | 9/2014 | Christensen et al. | |
| 2015/0192658 A1 | 7/2015 | Ullah et al. | |
| 2015/0356601 A1 | 12/2015 | Lu | |

FOREIGN PATENT DOCUMENTS

EP 2942717 11/2015
IN 2144CHE2010 A 5/2015

OTHER PUBLICATIONS

Yaeli, A., Bak, P., Feigenblat, G. et al. (2014). Understanding customer behavior using indoor location analysis and visualization. IBM Journal of Research and Development, 58, IBM J. Res. & Dev. vol. 58 No. 5/6 Paper 3 Sep./Nov. 2014.

(Continued)

*Primary Examiner* — Ajit Patel
(74) *Attorney, Agent, or Firm* — Garg Law Firm, PLLC; Rakash Garg; Isaac Gooshaw (57) ABSTRACT

From a collection of movement data of a device, a pattern of movement of the device in a venue is computed. An evaluation is made to determine whether the pattern fits a profile from a set of profiles. Each profile in the set of profiles includes a set of characteristics of a different type of user. A label of the profile indicative of a type of a user associated with the device is added to a data record in the collection when the evaluation is affirmative.

20 Claims, 5 Drawing Sheets

(56) References Cited

OTHER PUBLICATIONS

Disclosed anonymously. (2015). Method and Aparatus to use Micro-location based technology to personalize audio-visual devices. IPCOM000243750D, Oct. 16, 2015.
Monolith, In-store analytics to gain actionable insights, Amsterdam, London, Zurich, 2016.
Axis Communications Inc., Merchandising & Operation—Retail Surveillance, Dwell time, 2016.

* cited by examiner

| NAME (OPTIONAL) | TAG 402 | TYPE 404 | LAST UPDATED 406 | ADDITIONAL ANNOTATIONS 408 |
|---|---|---|---|---|
| <NAME> | <PROFILE> <PROFILE> ....... <PROFILE> | PROFILE TYPE | mm.dd.4414:hh.mm.ss | <PAUSE> <ZONE> <DURATION> <GROUP> etc. |
| JOHN Q P | CUSTOMER.MALE.SR.SPORT | EXTERNAL | 01:01:2016:18:32:01 | ZONES: MEN'S HEALTH,.... DURATION: AVG,30MIN/WEEK GROUP:SOLO |
| JANE DOE | BROWSER.FEMALE.FITNESS. PREFERRED | EXTERNAL | 02:09:2016:01:32 | DURATION: AVG,2HRS/DAY GROUP: GROUP CHECKOUT: 27% SENTIMENT: RELATED |
| GEORGE A | EMPLOYEE.TEMP.FOOTWEAR | INTERNAL | 03:13:2016:14:22:17 | DURATION: 8HRS, M-F CHECKOUT: 0% ZONES: FOOTWEAR, BREAKROOM |
| . . . | | | | |

400

410
412
414
416

DEVICE TAGGING USING MICRO-LOCATION MOVEMENT DATA

TECHNICAL FIELD

The present invention relates generally to a method, system, and computer program product for characterizing a behavior of a mobile device user based on the device's movement through an area. More particularly, the present invention relates to a method, system, and computer program product for device tagging using micro-location movement data.

BACKGROUND

A wireless data processing system, a wireless data communication device, or a wireless computing platform is collectively and interchangeably referred to herein as "mobile device" or "device". For example, many mobile devices not only allow the users to make voice calls, but also exchange messages and data, access remote data processing systems, determine a user's location or activity, communicate with other mobile devices or data processing systems, or perform network-based interactions and other transactions.

Wearable devices are a category of mobile devices. A wearable device is essentially a mobile device, but has a form-factor that is suitable for wearing the device on a user's person.

Micro-location technology includes components, protocols, and data communications designed to determine and collect precise location information from a mobile device as the device traverses through a geographical area or space. A geographical area or space through which is a device moves is collectively and interchangeably referred to as a venue.

As an example, a Bluetooth beacon operates on a Bluetooth network established between the beacon and a mobile device over a short distance—generally thirty feet or less. The Bluetooth beacon performs a low-energy exchange of small amounts of data with a mobile device in close proximity.

Wi-Fi beacons are also available to perform similar functions, but over greater distances, involving more data, and with a different degree of precision. Hybrid beacons are also available to operate over multiple protocols in an attempt to capture the best aspects of multiple solutions.

The data received at a beacon from a device in this manner is usable to identify the device or a user of the device, the location of the device, sending payload data such as advertising or coupons to the device, performing payment transactions, and the like. Thus, a micro-location technology uses the data collected from the device to track the device's movement in a venue where multiple beacons are deployed.

As a device moves away from one beacon and towards another beacon, the transition between the beacons allow the device's path to be mapped through the venue. When a device remains in communication with a beacon for a duration, the lack of transition to another beacon is interpreted as a pause at a location in the venue. The path and the pause are used to select payloads to be delivered to the device and other movement tracking purposes.

SUMMARY

The illustrative embodiments provide a method, system, and computer program product. An embodiment includes a method that computes, using a processor and a memory, from a collection of movement data of a device, a pattern of movement of the device in a venue. The embodiment evaluates whether the pattern fits a profile from a set of profiles, each profile in the set of profiles comprising a set of characteristics of a different type of user. The embodiment adds to a data record in the collection, responsive to the evaluating being affirmative, a label of the profile indicative of a type of a user associated with the device.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

An enormous number of devices enter and move in a business venue every day. A business enterprise may have several venues where such devices are present and moving. As the devices are moving in a venue, they produce device movement data, which is collected through a suitable micro-location technology.

It is quite common for business systems to end up with a large collection of device movement data in which the devices and/or their users are identified merely by the alphanumeric identifiers transmitted by the devices. in many cases, the identifiers are sufficient, e.g., to deliver payload data to a device identified in this manner while the device is traversing the venue. However, the illustrative embodiments recognize that such a manner of identifying the device and/or the user of the device is insufficient for a variety of other purposes.

The illustrative embodiments recognize that the device movement data can remain useful long after the device has left the venue. For example, it is often desirable for a business entity to analyze the behavior of a particular customer or a group of customers. Note that it is not necessary to identify the customer by the customer's name, but knowing the customer by the characteristics of the customer can lead to better customer service, improved floor design, advantageous product placement, and many other purposes.

Presently, the available device movement data can be analyzed to determine customer flow through the aisles in a venue, linger times at various locations in the venue, entry-to-exit durations, and so on. However, the illustrative embodiments recognize that the device movement data of a device is not sufficiently identified, tagged, annotated, or otherwise marked to be able to characterize the user associated with the device. For example, while it can be presently determined that a particular device entering a venue at a present time has traversed through the venue in the past, the device movement data of the present and past traversals is not suitably marked for instantly learning the characteristics of the device's user.

To give some non-limiting examples, it cannot be presently ascertained by the presently available device movement data analytics whether the user is an employee or a customer, male or female, a teenager or a retired person, a buyer or a browser, a sportsperson or a foodie, and many other such characteristics that can be associated with users of mobile devices. The illustrative embodiments recognize that characterizing a user simply by analyzing the movement data produced by the user's device is a challenging task.

The illustrative embodiments further recognize that once such a characterization is accomplished with a sufficient degree of confidence, the device of the user can be tagged or marked with the computed characteristics of the user. Such a manner of determining a user's characteristics from the movement data of the user's device and associating the characteristics with the user's device is presently unavailable. Associating user characteristic data with the user's device is helpful in rapid recognition of the type of the user when the device is present in a venue, in adjusting the venue for various user characteristics, and many other purposes.

The illustrative embodiments used to describe the invention generally address and solve the above-described problems and other problems related to device tagging using micro-location movement data.

An embodiment can be implemented as a software application. The application implementing an embodiment can be configured as a modification of an existing device movement data collection system, as a separate application that operates in conjunction with an existing device movement data collection system, a standalone application, or some combination thereof.

In many cases, although not necessarily, a mobile device is already configured with an application to enable communication and data exchange with beacons in a venue. In some cases, an embodiment optionally configures such an application on the mobile device to collect certain additional types of data and provide that data to the movement data collection system for use by the embodiment, as described herein.

A collection of device movement data corresponds to a venue. The venue is mapped using a suitable manner of identifying sub-areas within the venue, e.g., zones. In other words, a venue comprises a set of zones, where a zone is an area that is usable for any particular purpose. As some non-limiting examples in a retailing venue, a zone can be an aisle, a checkout area, a storage area, an employee break-room, a rest area, a floor area for merchandise of a certain type, and so on. Only as an example and not to imply any limitations on the illustrative embodiments, the various embodiments are described using a retailing venue and examples zones that may be found in such a venue.

An embodiment constructs a set of profiles. A profile includes a set of one or more characteristics of a type of a user, the user being a user of a mobile device that traverses a venue. For example, a user may be of type "employee" and may exhibit certain characteristics in their movements, i.e., in the movements of their device in a given venue. For example, one characteristic of an employee profile may be that the user dwells in one zone of the venue—to which the employee is assigned, e.g., footwear zone, cosmetics zone, appliances zone, and so on—for more than eighty percent of a typical work shift—e.g., between 10 AM and 6 PM. Another example characteristics of an employee profile may be that the user moves around in the venue during a typical work shift in a greater than a threshold percentage of user's visits to the venue.

A profile can describe a value or a range of values for a set of characteristics. Some non-limiting example characteristics include zone entry times, zone exit times, dwell times, total duration of visit, days of the visits, days of absence from the venue, times of absence from the venue or a zone, frequency of visits to the venue or a zone, number of pauses in a zone, zone or zones of interest, speed of movement through a zone or the venue, presence or absence of other users proximate to the user, and many others.

Depending on the type of user in a particular profile, all or some of these example characteristics, other or different similarly purposed characteristics, or some combination thereof may be present in the profile. Furthermore, even when the same characteristic is present in different profiles, the characteristic may have different value or range specified in such different profiles.

An example profile for an employee user is described above. Many other profiles for other types of users can similarly be defined. Some non-limiting examples of other profiles include profiles by roles such as employee, customer, browser or peruser, pass-through user, security worker, etc. Some other non-limiting examples of other profiles include profiles by history such as a customer who has previously bought something from the venue, a customer who has previously bought something from the venue, a customer who has previously gone to the customer service zone, etc.

Some other non-limiting examples of other profiles include profiles by age group or roles such as a student (appears at the venue for an hour after the school lets out), a retired person (appears at the venue during office hours and dwells for a threshold amount of time), an office worker (appears after office hours during weekdays and leaves within a threshold amount of time), and so on. Some other non-limiting examples of other profiles include profiles by gender or age such as a male (dwells more than a threshold percentage of visit time in zones for men's products), a female (dwells more than a threshold percentage of visit time in zones for women's products), a minor child (dwells more than a threshold percentage of visit time in zones for children's products), and so on.

Some other non-limiting examples of other profiles include profiles by preferences such as a sportsman (traverses through sporting goods zone in more than a threshold percentage of visits), a foodie (traverses directly to specialty foods zones and then to the checkout zone), and so on.

These simplified examples of profiles and the included characteristics with corresponding values or ranges are not intended to be limiting. From this disclosure, those of ordinary skill in the art will be able to conceive many other configurations of profiles and characteristics, and the same are contemplated within the scope of the illustrative embodiments. Furthermore, such configurations can be any complexity, e.g., from a simple configuration of one characteristics with one value or range, to a configuration of medium complexity using a combination of three or four characteristics with the corresponding values or ranges, to a very complex configuration which uses a combination of tens of characteristics with the corresponding values or ranges.

Furthermore, profiles can be grouped according to profile types. For example, one subset of profiles may apply only to employees where different profiles in the subset apply to employees at different positions in the organization. Similarly, another subset of profiles may apply only to patrons where different profiles in the subset apply to patrons of different types (customers, browsers, pass-through, etc.) Many other profiles types can be used to categorize profiles in a similar manner.

An embodiment analyzes a collection of device movement data pertaining to a device to identify a pattern of movement of the device during a period. For example, the pattern analysis uses a map or layout of the venue zones to construct a pattern of movement. A device can have more than one patterns of movements through a venue during a period.

An embodiment further analyzes a pattern of movement of the device according to one or more profiles. Some profiles are contextual. Accordingly, determining whether the pattern fits a contextual profile requires a contextual analysis. A contextual profile is a profile that uses some other data to provide a context or relationship information. For example, a profile of a customer who has previously purchased something from the venue is a contextual profile because it uses past data of the device's movement to provide the context for determining whether the profile fits the user or not. Similarly, as another example, a profile of a customer who has previously visited a zone in the venue is a contextual profile because it uses past data of the device's movement to provide the context for determining whether the profile fits the user or not.

Thus, an embodiment performs contextual analysis of the pattern to determine whether the pattern of the user's movement match a contextual profile. Matching a profile means matching or satisfying at least a threshold number of characteristics of the profile. Matching a characteristic of a profile means determining whether a given value—e.g. from a pattern—satisfies the value or range specified for that characteristic.

Similarly, some profiles are cognitive. Cognitive computing attempts to answer questions about a subject matter based on information available about the subject matter domain. Cognitive analytics is the process of analyzing available information or knowledge to create, infer, deduce, or derive new information. Cognitive analytics is frequently implemented in the form of a Question and Answer system (Q and A system).

Some profiles can be cognitive in that given what is generally known to be true about human behavior can be used in a cognitive analysis to determine whether a user is behaving in that manner. The distinction from contextual analysis is that contextual analysis uses the user's own data to provide context to an analysis of the user's other data, whereas cognitive analysis uses non-user specific behavioral information to compute a behavior parameter of the user.

For example, it is generally known that an upset human has elevated heartrate. If biometric data is available to an embodiment from a particular user's mobile device, the embodiment can perform a cognitive analysis using the knowledge about the relationship between heartrate and mood to establish whether the user fits an upset user's profile. Similarly, it is generally known that office workers are not available for shopping during office hours, and it is also generally known that office hours are generally Monday through Friday 9 Am through 5 PM. The embodiment can perform a cognitive analysis using the knowledge about the relationship between office times and roles of users to establish whether the user fits or matches an office worker's profile.

When the pattern matches a profile, an embodiment associates a label of that profile, e.g., a name of the profile, with the device identifier in the collection of device movement data. A device may have multiple profile labels associated therewith in this manner. The set of labels associated with a device forms the tag of the device.

Furthermore, some or all characteristics of a matching profile may be designated for specific tagging or annotation. For example, a profile of a customer type user may include a characteristic "zones visited". The "zones visited" characteristics may be designated for specific tagging. Accordingly, when a device's pattern fits the customer profile, the label "customer" is added to the tag and the "zones visited" characteristic is added as an additional annotation with the device.

Additionally, an embodiment further determines whether at least a threshold number or fraction of the profiles whose labels are included in the tag belong to a common profile type. When at least a threshold number or fraction of the profiles whose labels are included in the tag belong to a common profile type, the embodiment further associates with the device the common profile type.

The tag, the additional annotation, the profile type, or some combination thereof can be used to tag or mark the device within the scope of the illustrative embodiments. Furthermore, the tag or marking can be constructed using the labels, the additional annotation, the profile type, or some combination thereof, in any manner suitable to a particular implementation without departing the scope of the illustrative embodiments.

The manner of device tagging using micro-location movement data described herein is unavailable in the presently available methods. A method of an embodiment described herein, when implemented to execute on a device or data processing system, comprises substantial advancement of the functionality of that device or data processing system in marking device movement data with the characteristics of the user associated with the device. Such markings are usable to rapidly provide a service, change an arrangement in a venue, or deliver a payload to the user during a visit to the venue.

The illustrative embodiments are described with respect to certain types of venues, zones, device movements, movement data, profiles, profile types, profile characteristics, values, value ranges, thresholds, matchings, labels, tags, annotations, markings, analyses, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
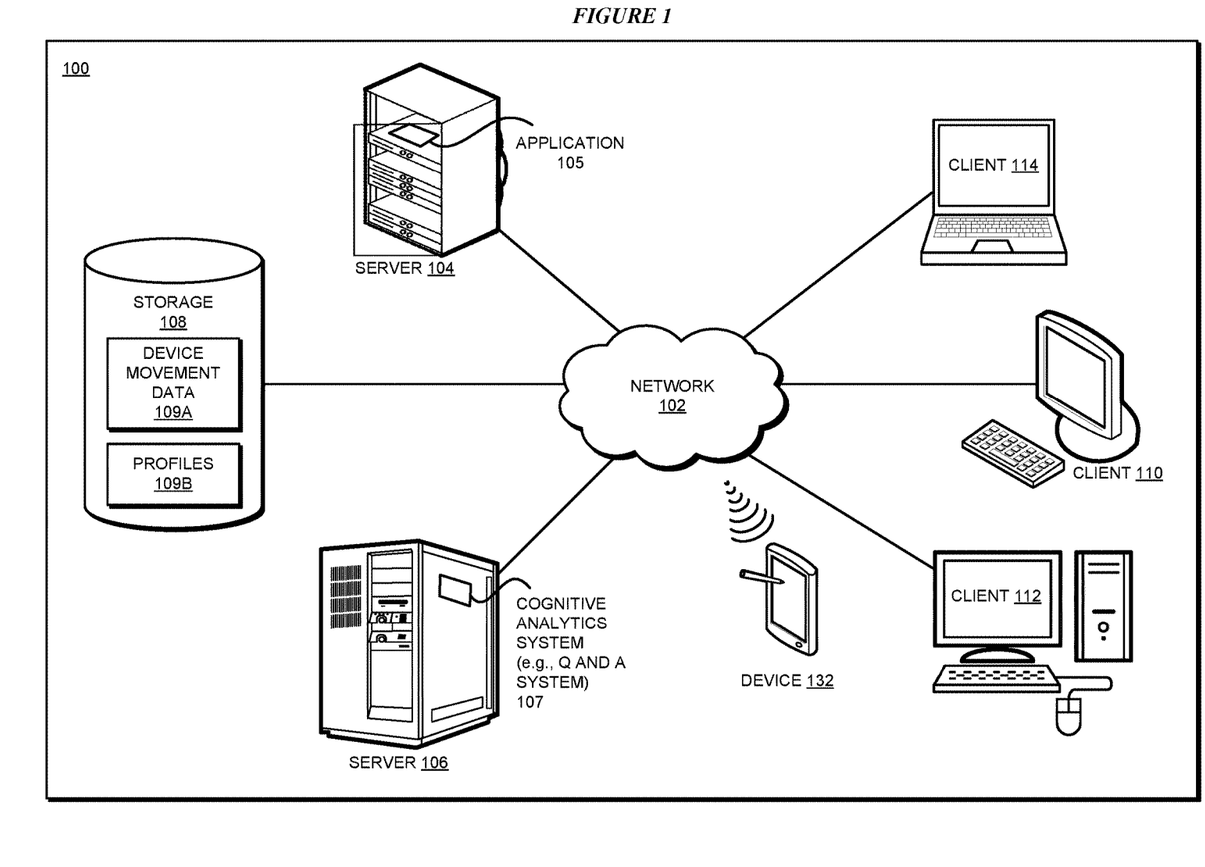
FIG. 1 depicts a block diagram of a network of data processing systems in which illustrative embodiments may be implemented.
Figure 2:
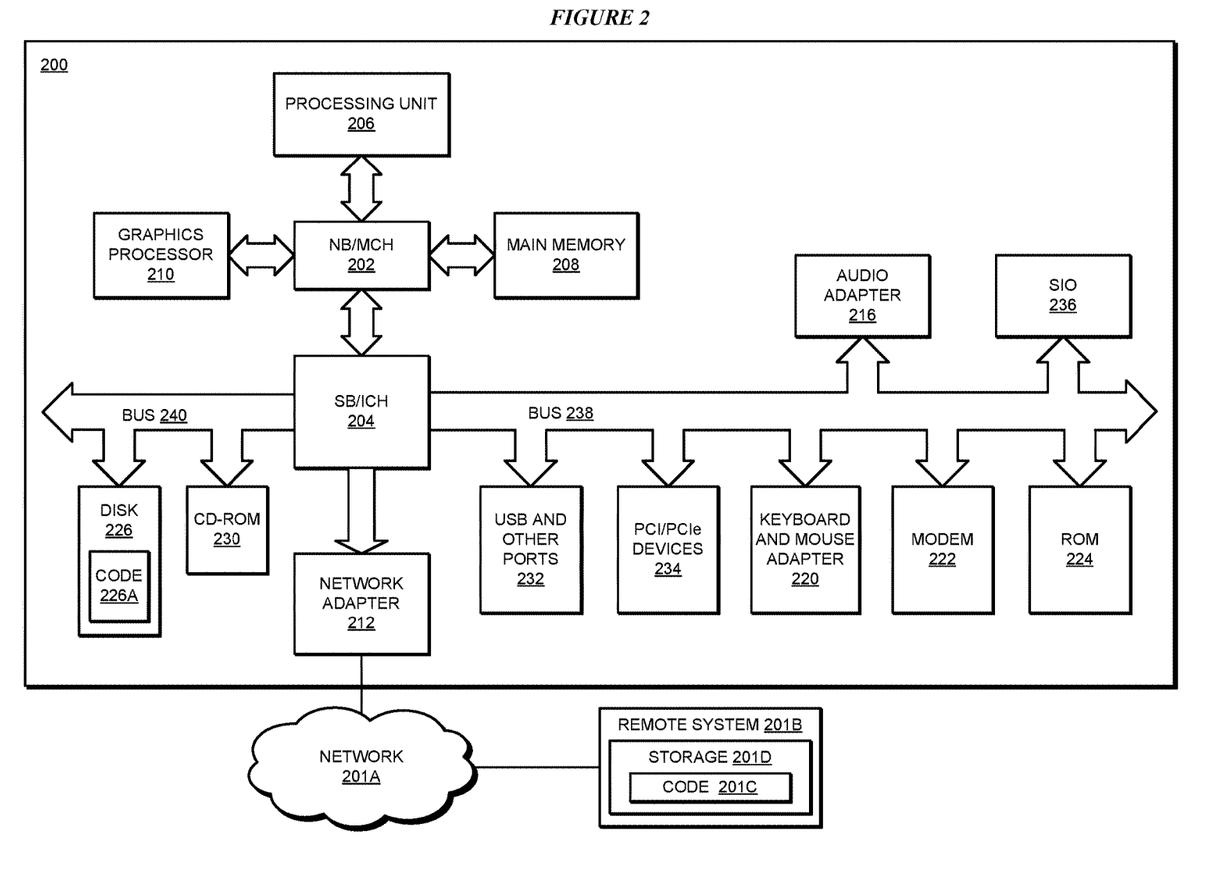
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 analyzes device movement data 109A using profiles 109A, and in part using cognitive analytics system 107 as needed according to the profile being used in the analysis. As a result of the analysis, application 105 marks device movement data 109A in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
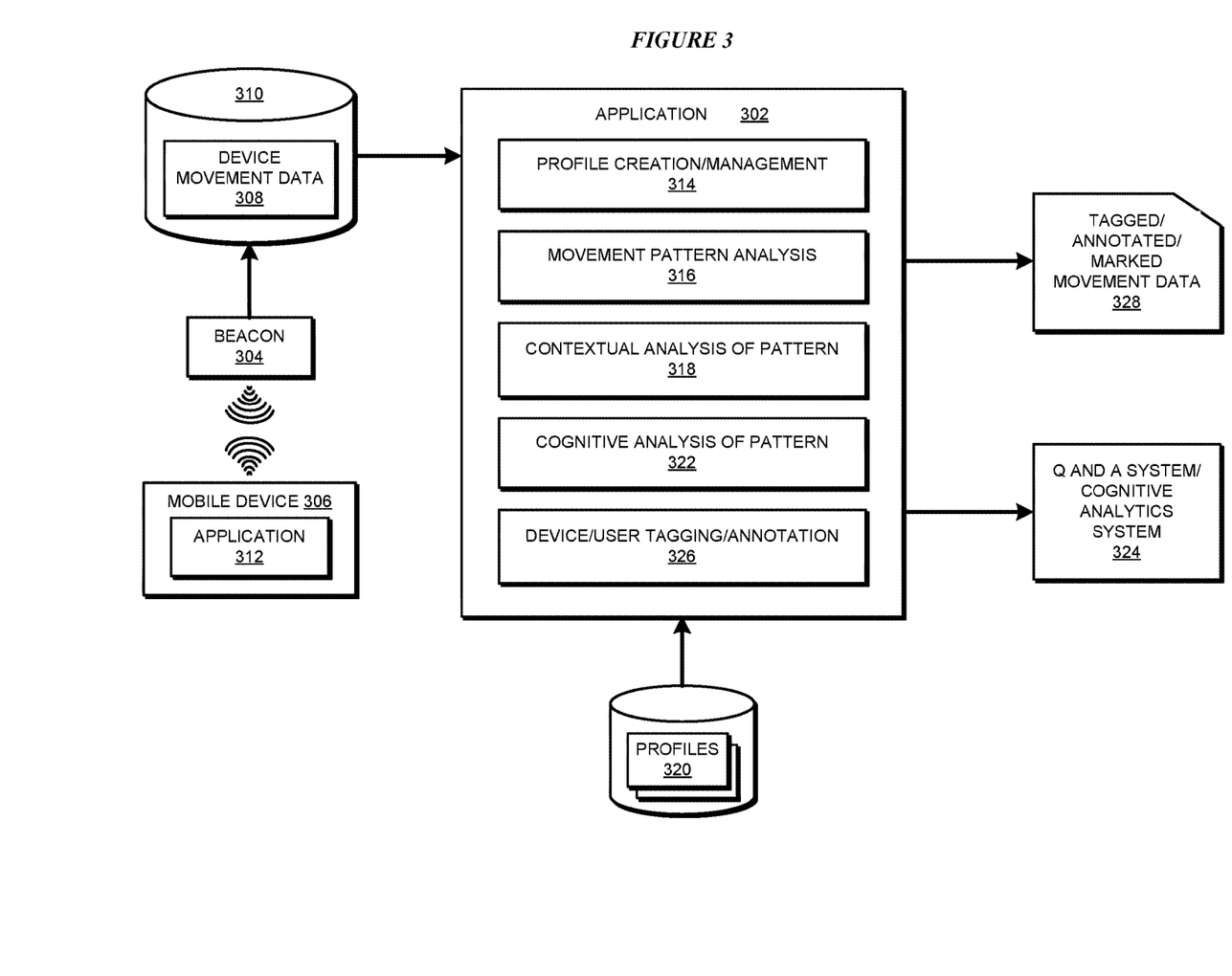
FIG. 3 depicts a block diagram of an example configuration for device tagging using micro-location movement data in accordance with an illustrative embodiment.

With reference to FIG. 3, this figure depicts a block diagram of an example configuration for device tagging using micro-location movement data in accordance with an illustrative embodiment. Application 302 is an example of application 105 in FIG. 1.

Beacon 304 is a component of a micro-location infrastructure as described herein. Beacon 304 communicates with mobile device 306 to collect device movement data 308 in repository 310. Data 308 is collected over a period, and may include data from more than one visits or traversals of device 306 in a given venue. Optionally, in some cases, application 312 executing in device 306 facilitates the collection of device movement data 308.

Component 314 creates and manages one or more profiles as described herein. Component 314 creates new profiles 320, changes an existing profile 320, removes a profile 320 that is no longer to be used, or some combination thereof.

Using data 308, component 316 performs a pattern analysis to determine a pattern of movement of device 306. When determining whether the pattern fits a contextual profile from profiles 320, component 318 uses past data of device 306 from repository 310 to perform contextual analysis of the pattern identified by component 314.

Similarly, component 322 determines whether the pattern fits a cognitive profile from profiles 320. Component 322 provides additional data of the user in conjunction with the pattern and a cognitive profile to cognitive analytics system 324. System 324 is trained in the subject-matter domain if human behavior analysis with a knowledgebase of human behavioral information. System 324 provides an answer with a corresponding degree of confidence whether the pattern and additional data of the user fit the cognitive profile as described herein.

The additional data of the user can take many forms. As an example, application 312 in mobile device 306 may collect and provide biometric data of a user of device 306. The biometric data may include, but is not limited to skin temperature, perspiration, tone or pitch of voice, shifting of weight or restlessness, jitters, pulse, skin conductivity, and so on. Such biometric data is also stored in repository 310.

As another example, the additional data may be other activities of device 306. For example, application 312 may provide data that is indicative of stressful activities on device 306, other visited locations prior to the visit at the venue, and many other types of data that can be used to determine a cognitive or behavioral state of the user. Device 306 can also provide information about a type of the device, a configuration of the device, and other similar information, which is usable to determine a level of education, tech-savvy, or other cognitive characteristics of the user of the device. Such information is another example of the additional data that is usable in the cognitive analysis of component 322.

Based on the results of the matches found by components 318 and 322, component 326 constructs a tag from the labels of the profiles, determines a profile type if applicable, composes one or more additional annotations, or some combination thereof, as may be applicable to the user of device 306. Component 326 marks device movement data with the combination of tag, type, and annotation to form tagged/annotated/marked device movement data 328.

Figure 4:
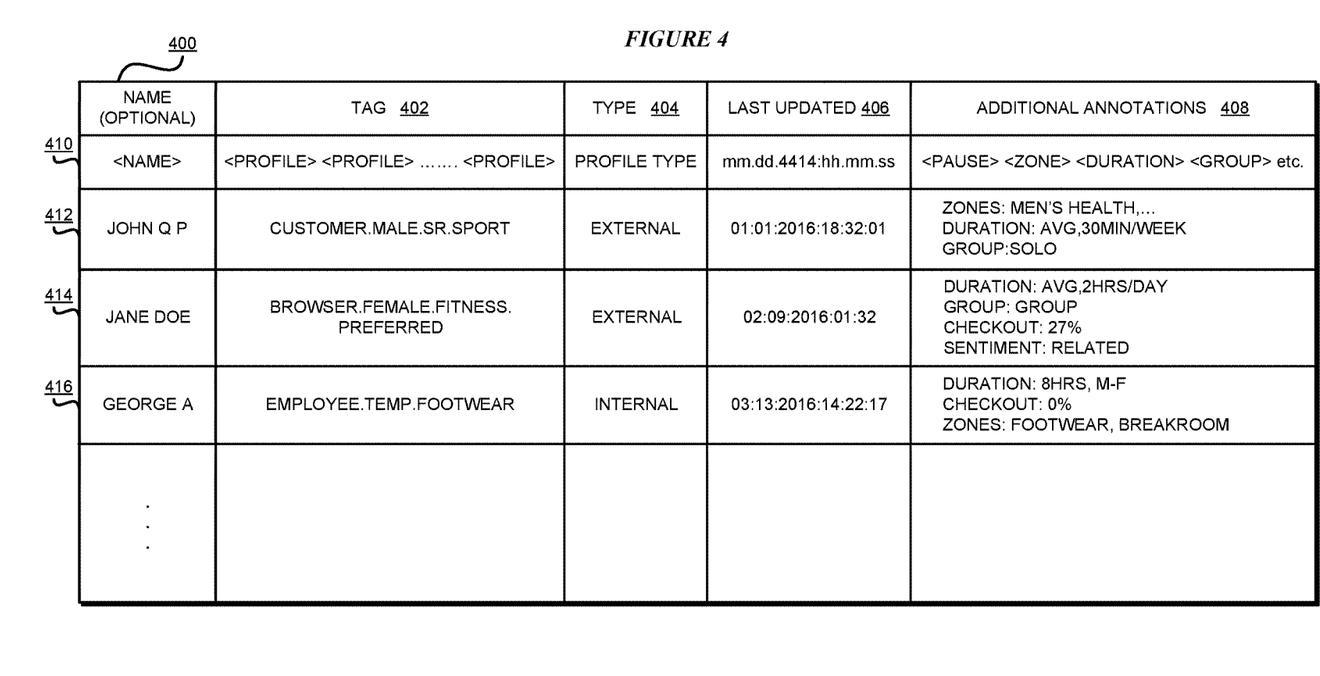
FIG. 4 depicts a simplified example of tagged device movement data in accordance with an illustrative embodiment.

With reference to FIG. 4, this figure depicts a simplified example of tagged device movement data in accordance with an illustrative embodiment. Data 400 is produced by an operation of application 302 of FIG. 3 as described herein.

Data 400 comprises movement data records, which are shown with some example data components and some example tags, profile types, and annotations. The actual device movement data is not shown, but could be populated in an additional column in the manner of the depicted data components.

For example, column 402 shows the tag associated with a record, the tag formed using one or more profile labels in a manner described herein. Column 404 depicts a profile type, if applicable to the record. Column 406 depicts a time the device movement data was recorded or updated. Column 408 depicts additional annotations associated with a record.

Row 410 shows an example structure adopted for the various components under the various columns. Rows 412, 414, and 416 show some non-limiting examples of tagged, annotated, or otherwise marked records for different example devices and their corresponding users, as described herein.

Figure 5:
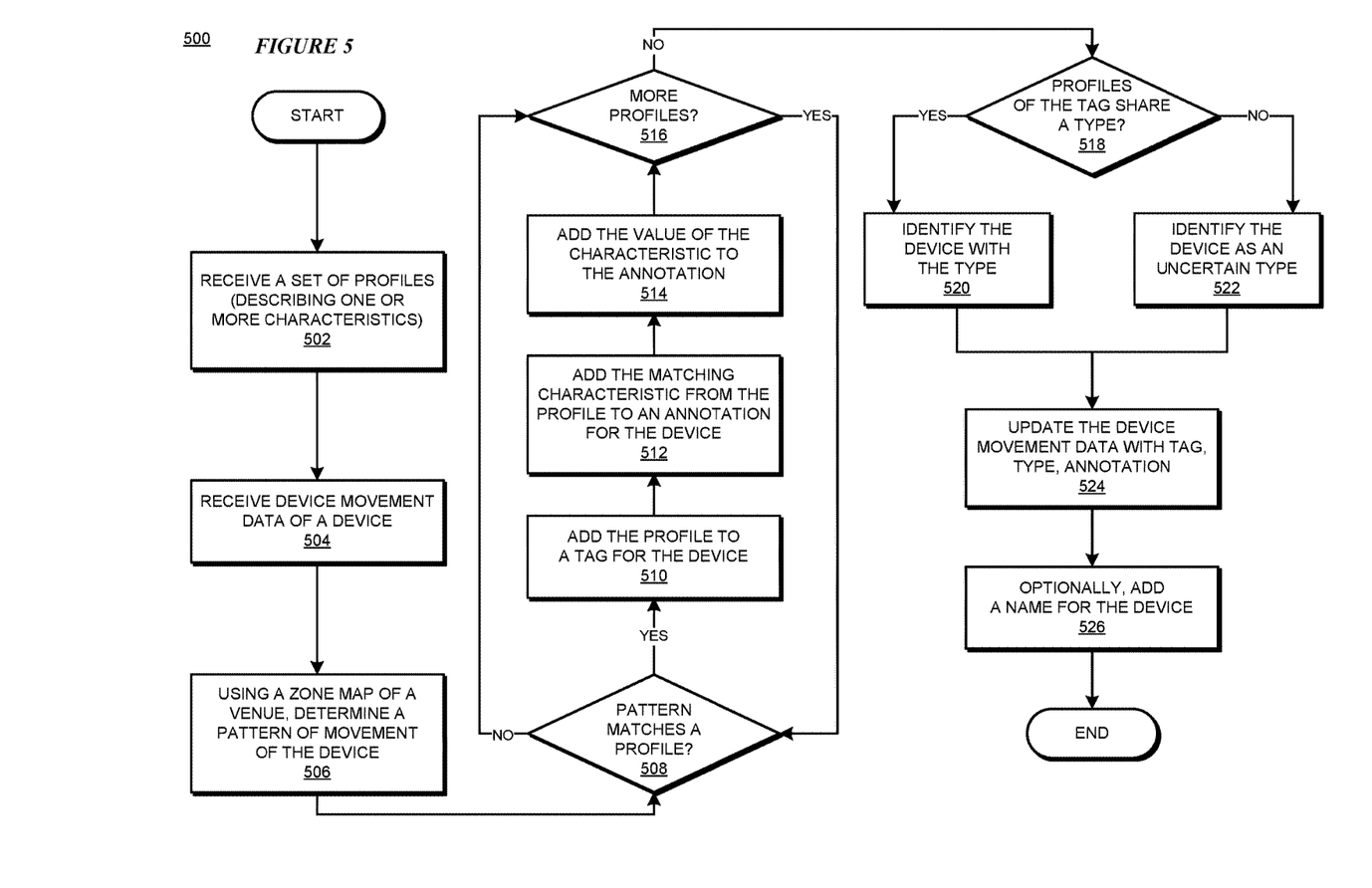
FIG. 5 depicts a flowchart of an example process for device tagging using micro-location movement data in accordance with an illustrative embodiment.

With reference to FIG. 5, this figure depicts a flowchart of an example process for device tagging using micro-location movement data in accordance with an illustrative embodiment. Process 500 can be implemented in application 302 in FIG. 3.

The application receives a set of profiles (block 502). The application receives device movement data of a device (block 504).

Using a zone map of a venue where the device is moving, or has moved, the application determines a pattern in the movements of the device (block 506). The application determines whether the pattern or a portion thereof matches a profile (block 508). The determination of block 508 is performed using the contextual and/or cognitive analysis described herein.

If the pattern or a portion thereof does not match the selected profile ("No" path of block 508), the application proceeds to block 516. If the pattern or a portion thereof matches the selected profile ("Yes" path of block 508), the application adds the profile, or a label thereof, to a tag for the device (block 510). Optionally, the application also adds one or more matching characteristics from the profile to an annotation for the device (block 512). When a characteristic is added to the annotation, the application also adds to the annotation a value of the characteristic, as determined from the movement data, (block 514).

The application determines whether more profiles remain to be processed for matching with the pattern in this manner (block 516). If more profiles remain ("Yes" path of block 516), the application returns to block 508 and selects another profile for the determination of block 508.

If no more profiles remain to be matched ("No" path of block 516), the application determines whether the all or at least a threshold fraction of the profiles used in the tag share a profile type (block 518). If at least a threshold fraction of the profiles used in the tag share a profile type ("Yes" path of block 518), the application identifies or marks the device with the profile type (block 520). If at least a threshold fraction of the profiles used in the tag do not share a profile type ("No" path of block 518), the application marks the device as belonging to a user of an uncertain profile type (block 522).

The application updates the device movement data with the tag, type, annotation, or some combination thereof (block 524). The application optionally adds a name for the user of the device, as depicted in one of the columns in FIG. 4 (block 526). The application ends process 500 thereafter.

Thus, a computer implemented method, system or apparatus, and computer program product are provided in the illustrative embodiments for device tagging using micro-location movement data and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   computing, using a processor and a memory, from a collection of movement data of a device, a pattern of movement of the device in a venue during a period;
   evaluating whether the pattern fits a profile from a set of profiles, each profile in the set of profiles comprising a set of characteristics of a different type of user; and
   adding to a data record in the collection of movement data of the device, responsive to the pattern fitting the profile from the set of profiles, a label of the profile indicative of a type of a user associated with the device.

2. The method of claim 1, further comprising:
   constructing the set of profiles, wherein a common characteristic is defined to have a first range of values in the profile, and wherein the common characteristic is defined to have a different range of values in a second profile, the first range of the characteristic causing the profile to correspond to a first type of user and the second range of the characteristic causing the second profile to correspond to a second type of user.

3. The method of claim 1, further comprising:
   determining, as a part of the evaluating whether the pattern fits the profile, whether a set of patterns computed from the pattern are within a subset of ranges, the subset of ranges being specified for a subset of characteristics in the profile, the evaluating being affirmative when the subset of characteristics is at least a threshold proportion of the set of characteristics in the profile.

4. The method of claim 1, wherein the pattern fits the profile because the pattern matches a range specified for the characteristic in the profile.

5. The method of claim 1, further comprising:
   performing, as a part of the evaluating, a contextual analysis relative to the profile, wherein the contextual analysis uses a past movement data of the device.

6. The method of claim 1, further comprising:
   performing, as a part of the evaluating, a cognitive analysis relative to the profile, wherein the cognitive analysis uses a knowledgebase of human behavior information to determine a cognitive state of the user of the mobile device, wherein the profile comprises a cognitive characteristic.

7. The method of claim 1, further comprising:
   operating a micro-location beacon to collect the movement data from the device.

8. A computer usable program product comprising one or more computer-readable storage devices, and program instructions stored on at least one of the one or more storage devices, the stored program instructions comprising:
   program instructions to compute, using a processor and a memory, from a collection of movement data of a device, a pattern of movement of the device in a venue during a period;
   program instructions to evaluate whether the pattern fits a profile from a set of profiles, each profile in the set of profiles comprising a set of characteristics of a different type of user; and
   program instructions to add to a data record in the collection of movement data of the device, responsive to the pattern fitting the profile from the set of profiles, a label of the profile indicative of a type of a user associated with the device.

9. The computer usable program product of claim 8, further comprising:
   program instructions to construct the set of profiles, wherein a common characteristic is defined to have a first range of values in the profile, and wherein the common characteristic is defined to have a different range of values in a second profile, the first range of the characteristic causing the profile to correspond to a first type of user and the second range of the characteristic causing the second profile to correspond to a second type of user.

10. The computer usable program product of claim 8, further comprising:
    program instructions to determine, as a part of the evaluating whether the pattern fits the profile, whether a set of patterns computed from the pattern are within a subset of ranges, the subset of ranges being specified for a subset of characteristics in the profile, the evaluating being affirmative when the subset of characteristics is at least a threshold proportion of the set of characteristics in the profile.

11. The computer usable program product of claim 8, wherein the pattern fits the profile because the pattern matches a range specified for the characteristic in the profile.

12. The computer usable program product of claim 8, further comprising:
    program instructions to perform, as a part of the evaluating, a contextual analysis relative to the profile, wherein the contextual analysis uses a past movement data of the device.

13. The computer usable program product of claim 8, further comprising:
    program instructions to perform, as a part of the evaluating, a cognitive analysis relative to the profile, wherein the cognitive analysis uses a knowledgebase of human behavior information to determine a cognitive state of the user of the mobile device, wherein the profile comprises a cognitive characteristic.

14. The computer usable program product of claim 8, further comprising:
program instructions to operate a micro-location beacon to collect the movement data from the device.

15. The computer usable program product of claim 8, wherein the computer usable code is stored in a computer readable storage device in a data processing system, and wherein the computer usable code is transferred over a network from a remote data processing system.

16. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to compute, from a collection of movement data of a device, a pattern of movement of the device in a venue during a period;
program instructions to evaluate whether the pattern fits a profile from a set of profiles, each profile in the set of profiles comprising a set of characteristics of a different type of user; and program instructions to add to a data record in the collection of movement data of the device, responsive to the pattern fitting the profile from the set of profiles, a label of the profile indicative of a type of a user associated with the device.

18. The computer system of claim 17, further comprising:

program instructions to construct the set of profiles, wherein a common characteristic is defined to have a first range of values in the profile, and wherein the common characteristic is defined to have a different range of values in a second profile, the first range of the characteristic causing the profile to correspond to a first type of user and the second range of the characteristic causing the second profile to correspond to a second type of user.

19. The computer system of claim 17, further comprising:

program instructions to determine, as a part of the evaluating whether the pattern fits the profile, whether a set of patterns computed from the pattern are within a subset of ranges, the subset of ranges being specified for a subset of characteristics in the profile, the evaluating being affirmative when the subset of characteristics is at least a threshold proportion of the set of characteristics in the profile.

20. The computer system of claim 17, wherein the pattern fits the profile because the pattern matches a range specified for the characteristic in the profile.

* * * * *